(12) United States Patent
Allison et al.

(10) Patent No.: US 7,036,035 B2
(45) Date of Patent: Apr. 25, 2006

(54) SYSTEM AND METHOD FOR POWER MANAGEMENT IN A COMPUTER SYSTEM HAVING MULTIPLE POWER GRIDS

(75) Inventors: Michael Allison, Fort Collins, CO (US); Bradley D. Winick, Fort Collins, CO (US); Daniel V. Zilavy, Fort Collins, CO (US); Edward A. Cross, Fort Collins, CO (US); Phillip David Langley, Granite Bay, CA (US); James E. Mankovich, Boulder, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 695 days.

(21) Appl. No.: 10/219,744

(22) Filed: Aug. 15, 2002

(65) Prior Publication Data

US 2004/0032168 A1 Feb. 19, 2004

(51) Int. Cl.
*G06F 1/30* (2006.01)
(52) U.S. Cl. ...................................... 713/340; 713/330
(58) Field of Classification Search ................ 713/300, 713/310, 330, 340
See application file for complete search history.

(56) References Cited

U.S. PATENT DOCUMENTS

| 5,155,842 | A | 10/1992 | Rubin |
| 5,717,934 | A | 2/1998 | Pitt et al. |
| 5,747,889 | A | 5/1998 | Raynham et al. |
| 5,793,124 | A | 8/1998 | Mitzaki |
| 6,184,593 | B1 | 2/2001 | Jungreis |
| 6,191,500 | B1 * | 2/2001 | Toy ............................ 307/64 |
| 6,288,456 | B1 * | 9/2001 | Cratty ........................ 307/64 |
| 6,304,981 | B1 | 10/2001 | Spears et al. |
| 6,433,444 | B1 * | 8/2002 | de Vries ..................... 307/64 |
| 6,854,065 | B1 * | 2/2005 | Smith et al. ............... 713/300 |
| 2002/0014802 | A1 * | 2/2002 | Cratty ........................ 307/43 |

* cited by examiner

*Primary Examiner*—Dennis M. Butler

(57) ABSTRACT

A system and method for power management in a computer system having multiple power grids is disclosed. The system includes a service structure operable in conjunction with an operating system (OS) instance executed on the computer system. At least one uninterrupted power supply (UPS) and at least one alternative source of power provide power to the multiple power grids. Where an UPS sends a loss of power notification to the service structure, the service structure is operable to maintain power supply to the grids from an available alternative source of power.

29 Claims, 4 Drawing Sheets

SYSTEM AND METHOD FOR POWER MANAGEMENT IN A COMPUTER SYSTEM HAVING MULTIPLE POWER GRIDS

BACKGROUND OF THE INVENTION

1. Technical Field of the Invention

The present invention generally relates to computer systems. More particularly, and not by way of any limitation, the present invention is directed to a system and method for power management in a computer system having multiple power grids.

2. Description of Related Art

The reliability and quality of a computer system depends on properly protecting the hardware components of the computer system against power disturbances. Power disturbances can be divided into several categories. Noise or static is a minor disturbance characterized by a small change in voltage. A transient, sometimes called a spike or surge, is a disturbance characterized by a very short, but extreme burst of voltage. Brownouts and blackouts are severe disturbances characterized by the temporary drop and complete loss of electric power, respectively.

Of these disturbances, blackouts pose a serious threat to today's computer systems which heavily rely on volatile memory components that are particularly susceptible to power interruptions. Prior to shutting down a computer system, it is important to ensure that no portion or segment of the system is in a condition of instability. In a blackout, a complete power interruption causes the instant shutdown of a computer system thereby disrupting and destabilizing the transfer and storage of data. The data may be lost or corrupted or placed in an unpredictable form.

Therefore, it is essential that a computer system avoid power interruptions and maintain extended availability or "uptime." To provide uptime, many computer systems are equipped with multiple power grids that are powered by one or more AC power lines. To provide redundancy in the system, each AC power line may be operating on a separate breaker. Moreover, to provide further redundancy, the AC power lines may be connected to multiple municipal power grids. When a particular AC power line loses power, the power grid may continue to maintain power to the system from an alternative AC power line.

Although these computer systems are provided with redundant AC power sources to guard against power interruption, such systems are not without limitations. In many instances, connecting AC power lines to multiple municipal power grids is prohibitively expensive. Moreover, even if a computer system is connected to multiple municipal power grids, an area-wide power outage over several municipalities or similar single point fault can bring down the computer system. To overcome these types of single point faults, computer systems employ uninterrupted power supplies (UPSs) that are typically equipped with a battery and a loss-of-power sensor. When the UPS detects a power failure, it switches over to the battery so that the computer system may remain operational. If power service does not resume, the UPS sends a power loss notification to the operating system (OS) so that the OS may begin an orderly and graceful shutdown.

It has been found, however, that UPS-based arrangements are not without limitations either. Regardless of the availability of alternative sources of power, when an UPS detects a power failure and power does not resume, the UPS sends a power loss notification to the OS thereby effectuating a shutdown. More specifically, an UPS detecting a sustained power failure will send a power loss notification to the OS even when an AC power line or second UPS is available as an alternative power source. Therefore, the existing power management systems employing one or more UPSs needlessly begin shutdowns in the event of a power failure.

SUMMARY OF THE INVENTION

Accordingly, the present invention advantageously provides a system and method for power management that overcomes these and other drawbacks and deficiencies of the existing power management solutions. The system includes a service structure operable in conjunction with an operating system (OS) instance executed on a computer system. At least one uninterrupted power supply (UPS) and at least one alternative source of power provide power to the multiple power grids, which are monitored by the service structure. Where an UPS sends a loss of power notification to the service structure, the service structure is operable to maintain power supply to the grids from an available alternative source of power.

BRIEF DESCRIPTION OF THE DRAWINGS

A more complete understanding of the present invention may be had by reference to the following Detailed Description when taken in conjunction with the accompanying drawings wherein.

DETAILED DESCRIPTION OF THE DRAWINGS

Figure 1:
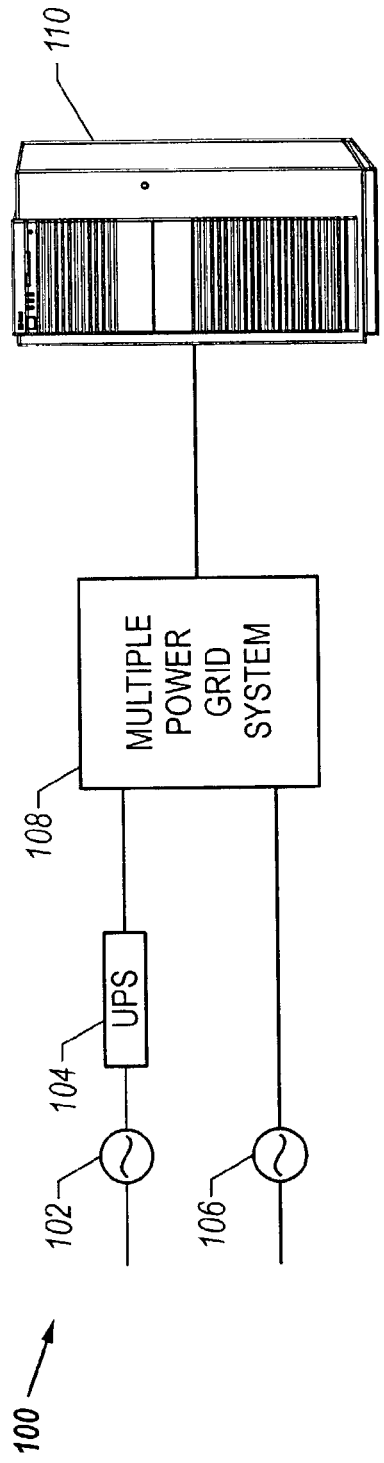
FIG. 1 depicts a functional block diagram illustrating an embodiment of a computer system having a multiple power grid arrangement wherein a power management system may be advantageously employed in accordance with the teachings of the present invention.

In the drawings, like or similar elements are designated with identical reference numerals throughout the several views thereof, and the various elements depicted are not necessarily drawn to scale. Referring now to FIG. 1, depicted therein is an embodiment of a computer system 100 employing a power management system in accordance with the teachings of the present invention. An AC power line 102 supplies power to an uninterrupted power supply (UPS) 104. The UPS 104 and an alternative source of power, another AC power line 106, supply power to a multiple power grid system 108 which, in turn, supplies power to a computer hardware platform 110. Although only one AC power line with UPS is depicted, more than one AC power line with separate UPS(s) may supply power to the grid system 108.

Moreover, whereas the alternative source of power is exemplified as a single AC line 106, it can comprise any number and type of AC power lines.

UPS 104 is equipped with a battery and loss-of-power sensor (not shown) such that upon detecting a loss of power at AC power line 102, it switches over to the battery so that power may be continually provided to the multiple power grid system 108. Moreover, UPS 104 is operable, responsive to detecting a loss of power in AC power line 102, to send a loss of power notification to a Power Management Service Structure (PMSS) operating in conjunction with an OS of the computer system as will be described in greater detail below. UPS 104 may immediately send the loss of power notification to the PMSS upon detecting a power loss or it may send the loss of power notification to the PMSS upon detecting a sustained loss of power.

The power grid system 108 is a systematic network of power lines that appropriately route power from the UPS 104 and AC power line 106 to the computer hardware platform 110. Computer platform 110 may include any operating environment and combination of hardware, software or firmware. In one implementation, computer platform 110 offers a multiprocessor, multicellular environment with partitioning capabilities wherein the multiprocessor, multicellular architecture can be partitioned into any configuration of hard and soft partitions. Moreover, the platform 110 executes at least one instance of an operating system (OS) such as UNIX, HP-UX, Windows NT, Sun Solaris, Linux, or the like. Preferably, such a computer platform 110 is highly reliable, adaptable, and efficient to provide leading performance and high-end server capabilities to handle today's mission-critical applications.

Figure 2:
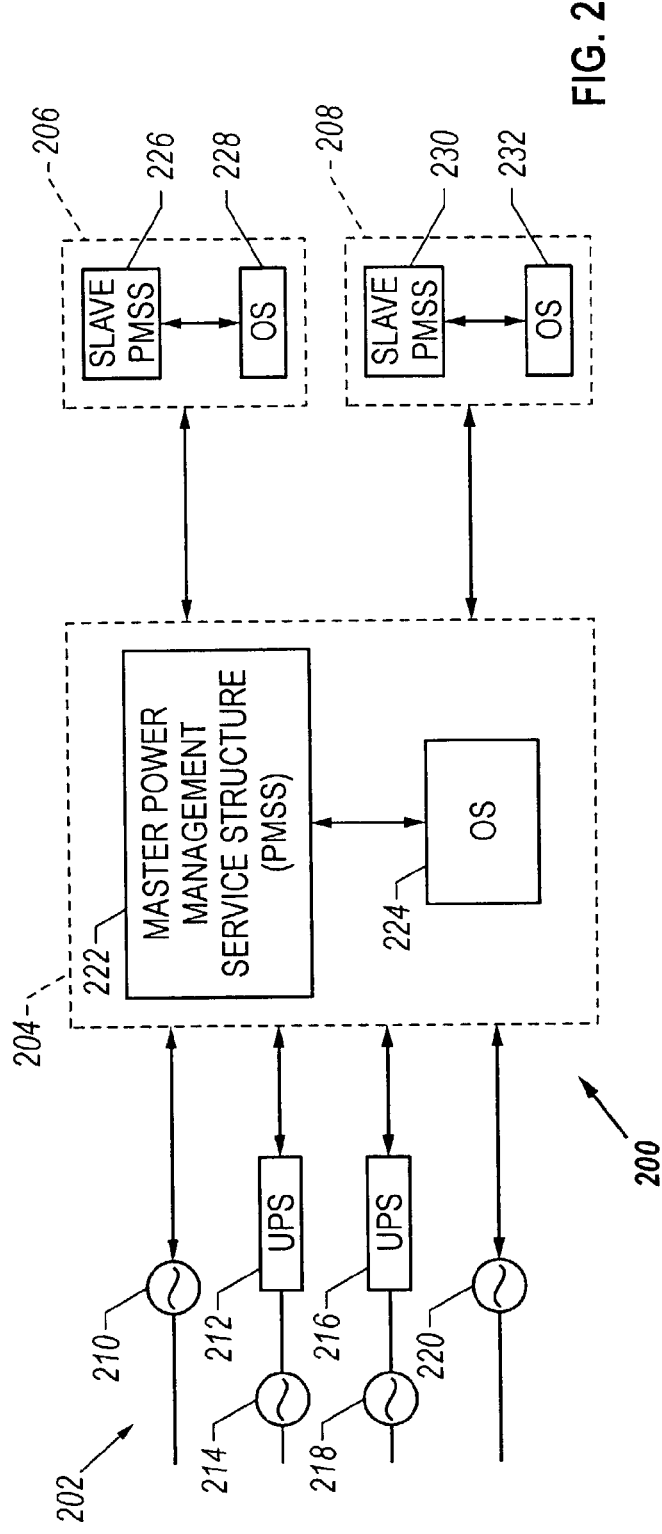
FIG. 2 depicts a functional block diagram of an embodiment of a power management system provided in accordance with one embodiment of the present invention.

FIG. 2 depicts a functional block of a power management system provided in accordance with the teachings of the present invention for operation in conjunction with a computer system 200 such as the computer platform 110 described above. One or more portions, e.g., portions 204, 206, and 208, form the computer system 200 which receives power from a plurality of power sources 202 via a power conditioning grid (not shown). It should be recognized that portions 204–208 are illustrative of any type of hardware-based or software-based partitioning arrangements, and may include one or more processors and can traverse cellular boundaries.

Each portion is operable to execute an OS instance. For example, portion 204 is provided with OS instance 224. Likewise, portions 206 and 208 are provided with OS instances 228 and 232, respectively. One of the portions, e.g., portion 204, may be provided as a coordinator for the entire computer system 200 in order to monitor and manage the overall functioning of the computer system, including its power management system.

As illustrated, power sources 202 include AC power line 210, UPS 212 powered by AC power line 214, UPS 216 powered by AC power line 218, and AC power line 220. The power sources 202 may be connected to the same or different breakers, and, similarly, the power sources may be connected to one or more municipal power grids. Portion 204 includes a master Power Management Service Structure (PMSS) 222 in communication with OS 224. Master PMSS 222 monitors the power sources 202 and upon receiving a loss of power notification from an UPS, such as UPS 212 or UPS 216, the master PMSS 222 permits portions 204–208 to continue to receive power supply from an alternative source or sources of power. If no alternative source of power is available, however, the master PMSS 222 sends a corresponding loss of power notification to OS 224. The loss of power notification allows OS 224 to commence a graceful shutdown for the entire computer system 200. Accordingly, appropriate power loss messages are propagated to portions 206 and 208. In portion 206, a slave PMSS 226 receives the power loss message from the master PMSS 222 and sends a corresponding notification to OS 228 to manage the shutdown of the portion 206. Similarly, in portion 208, a slave PMSS 230 receives the loss of power message from the master PMSS 222 and sends a corresponding loss of power message to OS 232 to manage the shutdown of the portion 208.

Figure 3:
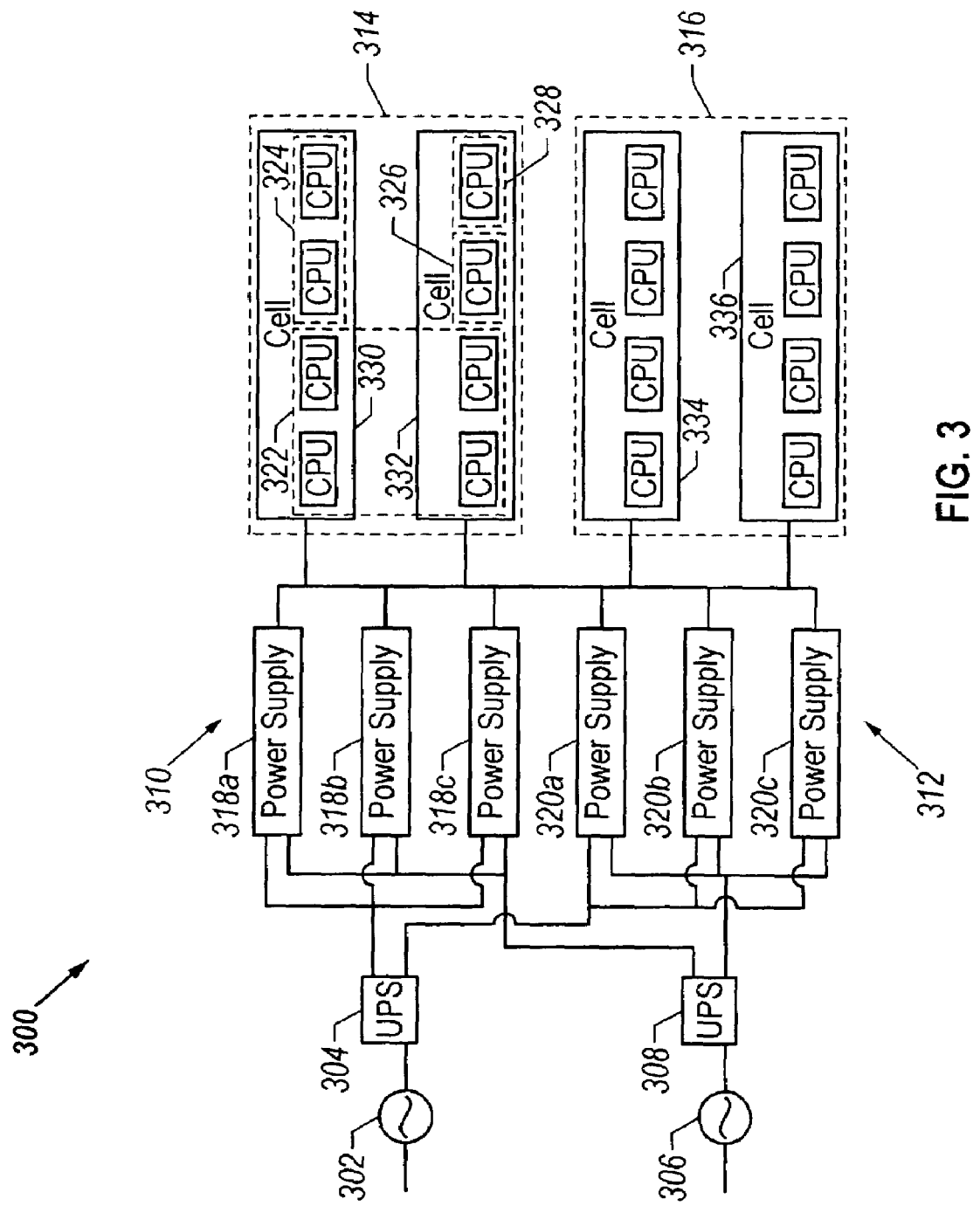
FIG. 3 depicts a functional block diagram of an embodiment of a multicellular, multiprocessor computer system employing the power management system of the present invention.

FIG. 3 depicts a functional block diagram of an exemplary multicellular, multiprocessor computer system 300 having multiple power grids which employs the power management system of the present invention. An AC power line 302 supplies power to an UPS 304. Similarly, another AC power line 306 supplies power to an UPS 308 for redundancy. Preferably, in one exemplary implementation, the AC power line 302 and the AC power line 306 are supplied power by different municipal power grids. UPS 304 and UPS 308 supply power to a power grid 310 and a power grid 312 which in turn supply power to a hard partition 314, illustrated by dashed lines, and a hard partition 316, likewise illustrated by dashed lines. The power grid 310 is a systematic network of power lines and conditioning power supplies, such as power supplies 318a, 318b, and 318c, that appropriately route power to the hard partition 314 and the hard partition 316. Similarly, the power grid 312 is a systematic network of power lines and power supplies, such as power supplies 320a, 320b, and 320c, that appropriately route redundant power to the hard partitions 314 and 316.

As illustrated, the hard partition 314 comprises four soft partitions 322, 324, 326, and 328, each operable to execute an instance of OS, and two cells 330 and 332. Each cell includes a bank of central processing units (CPUs). The partitions may straddle cells as soft partition 332 straddles cells 330 and 332. The hard partition 316 executes a single instance of an OS and two cells 334 and 336 with no soft partitions. Again, each cell 334 and 336 includes a bank of CPUs. It should be appreciated by those skilled in the art that any combination of partitions, cells and processors is within the teachings of the present invention.

In operation, the master PMSS runs within a particular partition. For example, the master PMSS may execute within hard partition 316. Each soft partition 322, 324, 326, and 328 may execute a slave PMSS. As previously discussed, the master PMSS monitors the power grids 310 and 312 as well as the power sources, the UPS 304 and 306. Additionally, the master PMSS is in communication with each slave PMSS. It should be apparent to those skilled in the art that other communication arrangements are possible. For example, the master PMSS may communicate with the slave PMSS of partition 324, which, in turn, may communicate with slave PMSS of partitions 322, 326, and 328. Additionally, as a measure of further redundancy, if the master PMSS becomes nonoperational, a slave PMSS may become the new master PMSS to continue to provide fault tolerance. Further, other computer configurations are possible as well. For example, the hard partitions may be provided in different computer platforms.

If UPS 304 were to lose power, by way of exemplary operation, UPS 304 would send a loss of power notification to the master PMSS being executed in hard partition 316. The master PMSS then queries to determine whether the alternative sources of power, i.e, UPS 308, has power available. If UPS 308 is able to supply power to hard partitions 314 and 316, then the master PMSS will continue using the supply power from UPS 308. Additionally, the PMSS may not forward a corresponding loss of power notification to the OS being executed within the hard partition 316. Likewise, the master PMSS may not forward a corresponding loss of power notification to the slave PMSSs residing in soft partitions 322, 324, 326, and 328. By monitoring the power sources, continuing to obtain supply power from an alternative source, and forwarding loss of power notifications at the appropriate time, the power management scheme of an embodiment of the invention maximizes system uptime by avoiding unnecessary shutdowns.

Conversely, if power is not available from UPS 308 to power the hard partitions 314 and 316, then the master PMSS sends a corresponding loss of power notification to the OS being executed in the hard partition 316. Additionally, the corresponding loss of power notification is propagated to the slave PMSSs running on soft partitions 322, 324, 326, and 328. The slave PMSSs, in turn, notify their respective OSs. It should therefore be appreciated that the coordinated power loss notification scheme of the present invention avoids a complete and abrupt power interruption wherein data may be lost or corrupted or placed in an unpredictable form. Moreover, the graceful shutdown sequence effectuated in accordance with the notification scheme avoids damage to valuable hardware components of the system 300.

Figure 4:
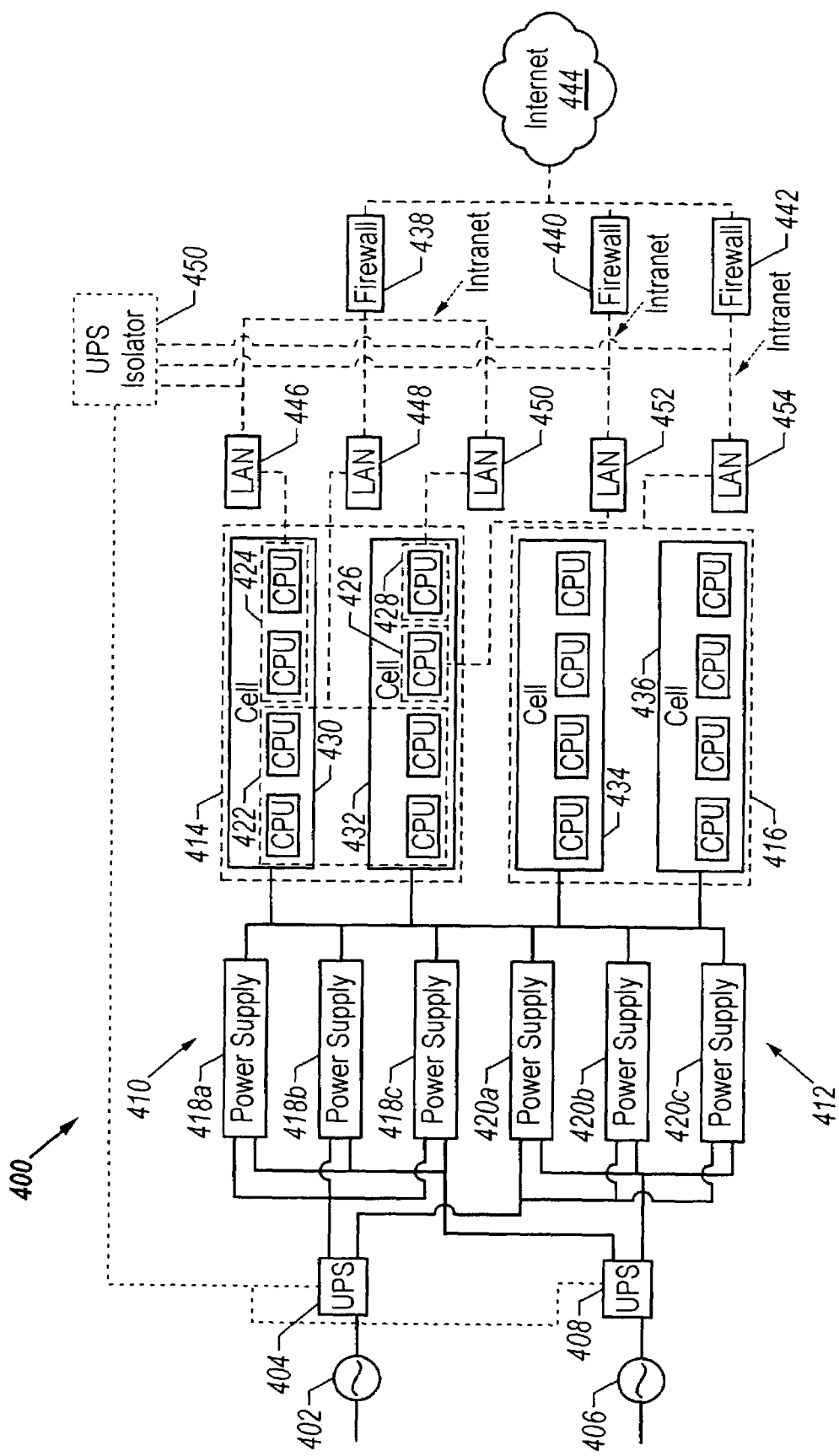
FIG. 4 depicts a functional block diagram of an embodiment of a multicellular, multiprocessor computer system having a firewall arrangement in a networked configuration wherein an embodiment of the power management system is employed.

FIG. 4 depicts a functional block diagram of an embodiment of a multicellular, multiprocessor computer system 400 in a firewall configuration wherein the PMSS arrangement of the present invention is practiced. Similar to the computer system 300 shown in FIG. 3, AC power lines 402 and 406 supply power to an UPS 404 and 408, respectively. Again analogous to the computer system 300 described in detail above, UPS 404 and 408 supply power to redundant power grids 410 (having power supplies 418a–c) and 412 (having power supplies 420a–c). The multicellular computing environment is supported by cells 430, 432, 434, and 436, which are organized into hard partitions 414 and 416. A plurality of soft partitions, e.g., partitions 422, 424, 426, and 428, are supported by hard partition 414.

As illustrated, the computer system 400 employs a firewall configuration wherein the computer system is connected to an outside network source via one or more local area network (LAN) connections. Firewalls 438, 440, and 442 employ a combination of hardware, software, and firmware to limit the exposure of the computer system to an unauthorized access from an outside source such as a source emanating from the Internet 444. Each partition may be connected to the Internet 444 by a LAN connection and firewall. For example, a LAN 446 connects soft partition 424 to the Internet via firewall 438. Likewise, several different connections are possible since each partition is interfaced via a separate LAN (reference numerals 446–454) that are served by the three firewalls 438, 440, and 442. It should be apparent to those skilled in the art that other firewall configurations are possible as well.

As the firewalls 438, 440 and 442 may prevent the different partitions from communicating with one another, an UPS isolator 450 is provided for managing the power loss messaging scheme effectuated over an "intranet" of LANs. The UPS isolator 450 is operable to communicate with UPS 404 and UPS 408 as well as all the partitions running a master PMSS or slave PMSS. The UPS isolator 450, which can be any combination of hardware, software, or firmware, is a part of the intranet that allows the master PMSS and slave PMSSs within different partitions to communicate with each other. For example, if a master PMSS is executed within partition 416 and slave PMSSs are executed in partitions 422, 424, 426, and 428, the master PMSS monitors the UPS 404 and 408 via the UPS isolator 450 and the intranet. Additionally, the master PMSS communicates to the slave PMSSs via the intranet. Alternatively, the master PMSS may be executed on the UPS isolator 450 and slave PMSSs are executed on the partitions 416, 422, 424, 426, and 428. Thus, the power management scheme of the present invention is advantageously adaptable to effectuate a graceful shutdown mechanism in a computer system having a firewall arrangement in an intranet.

Figure 5:
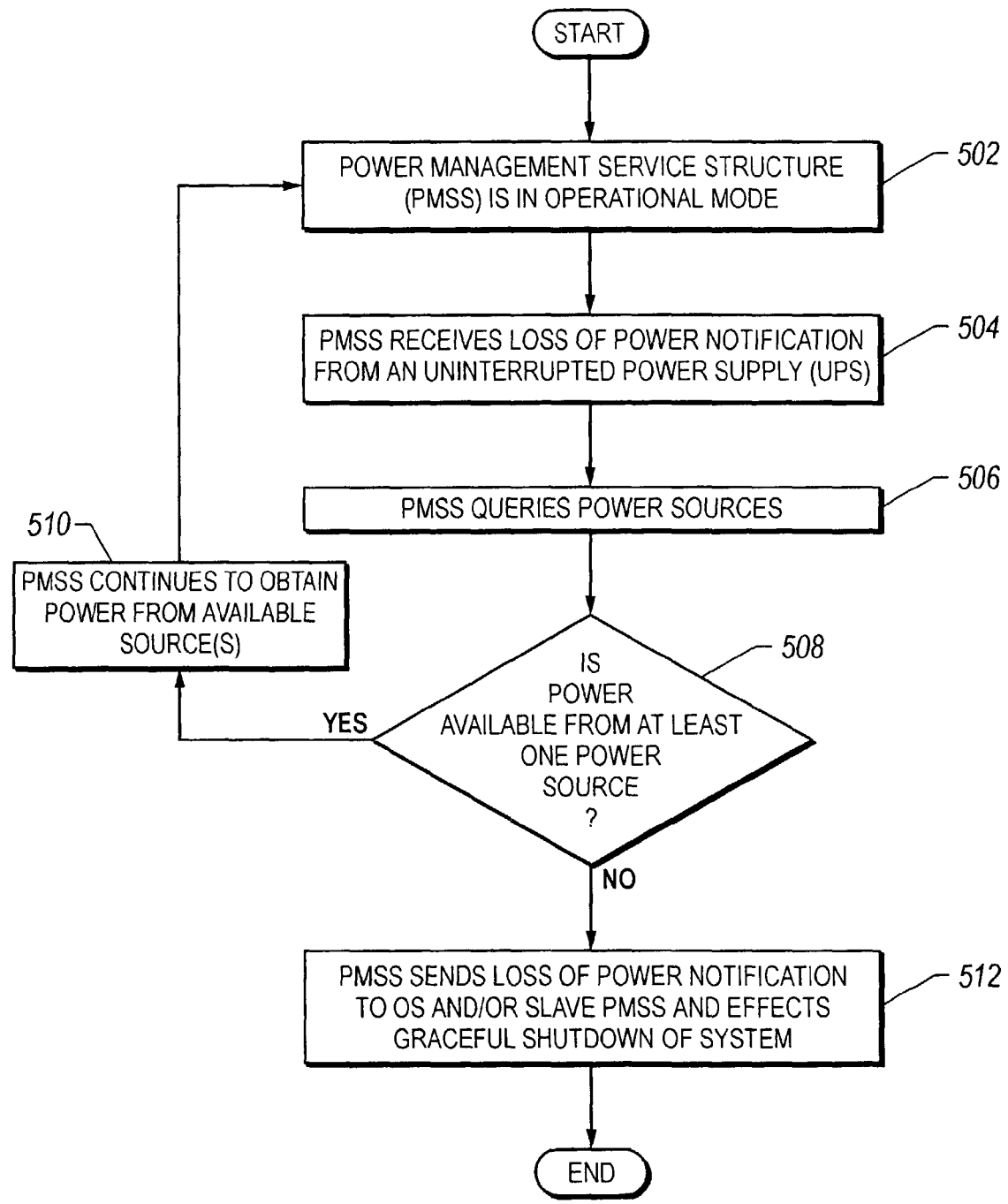
FIG. 5 depicts a flow chart of the various operations involved in an embodiment of the power management method in accordance with the teachings of the present invention.

FIG. 5 depicts a flow chart of the various operations involved in one embodiment of a method for power management in accordance with the teachings of the present invention. At block 502, a computer system and associated PMSS are in operational mode. During operational mode, the PMSS monitors the available sources of power. As pointed out earlier, a monitored UPS may send a notification immediately upon detecting a power interruption or only upon a sustained power interruption. One skilled in the art will realize that the PMSS of the present invention is flexible enough to configure with any loss of power notification scheme and provide appropriate messaging internal to the computer system in response thereto.

Upon receiving a loss of power notification from a UPS (block 504), the PMSS queries the available power sources (block 506). At decision block 508, if power is available from at least one power source, then PMSS continues to use power supplied from the available power source or sources (block 510). This may be done on a grid-by-grid basis or as needed. At this point, as illustrated by the return flow, the PMSS returns to operational mode (block 502). Conversely, if no alternative source of power is available, the PMSS sends loss of power notification to the OS and/or slave PMSS, thereby effectuating a graceful shutdown of the system (block 512).

Based on the foregoing, it should be appreciated that the present invention provides a power management system and method that advantageously overcome the shortcomings and deficiencies of the existing solutions. The power management scheme of the present invention maximizes the amount of uninterrupted time a computer system is operational and available by providing an intelligent power management service structure that monitors all available power sources before deciding to send a loss of power message to an OS instance running on the computer system. Thus, the PMSS arrangement continues to use power from alternative available power sources and overrides UPS-generated loss of power notifications when power is available from at least one alternative source. Accordingly, the present invention maximizes uptime and prevents computer systems from needlessly being shut down. Furthermore, the resultant power management scheme is reliable enough and robust enough to be incorporated into today's multicellular, multiprocessor systems having multiple power grids where uptime is critical. Moreover, the power management scheme is adaptable within a firewall configuration, whereby network security is not compromised.

Although the invention has been described with reference to certain illustrations, it is to be understood that the forms of the invention shown and described are to be treated as presently preferred exemplary embodiments only. Various changes, substitutions and modifications can be realized without departing from the spirit and scope of the invention as defined by the appended claims.

What is claimed is:

1. A system for power management in a computer system having at least one power grid, said computer system operating to execute at least one instance of an operating system (OS), comprising:
   at least one uninterrupted power supply (UPS) operating to supply power to a portion of said at least one power grid, wherein said at least one UPS is operable to send a loss of power notification;
   at least one alternative source of power for supplying power to said at least one power grid; and
   a service structure executable on said computer system, said service structure for monitoring said at least one UPS and said at least one alternative source of power, wherein said service structure is operable, responsive to receiving said loss of power notification from said at least one UPS, to continue to maintain power supply of said computer system from said at least one alternative source of power upon determining that said at least one alternative source of power is operational.

2. The system for power management in a computer system having at least one power grid as recited in claim 1, wherein said at least one alternative source of power includes an AC power line.

3. The system for power management in a computer system having at least one power grid as recited in claim 1, wherein said at least one alternative source of power includes a second UPS.

4. The system for power management in a computer system having at least one power grid as recited in claim 1, wherein said service structure is operable to send a loss of power message to said at least one OS responsive to receiving said loss of power notification.

5. The system for power management in a computer system having at least one power grid as recited in claim 1, further comprising a second instance of OS installed on said computer system.

6. The system for power management in a computer system having at least one power grid as recited in claim 5, wherein said at least one OS and said second instance of OS are disposed in a partitionable configuration of said computer system.

7. The system for power management in a computer system having at least one power grid as recited in claim 5, wherein said service structure is operable to send a loss of power message to said second instance of OS upon determining that no alternative source of power is operational.

8. The system for power management in a computer system having at least one power grid as recited in claim 7, wherein said service structure sends said loss of power message to said second instance of OS via a slave service structure in communication with said service structure and said second instance of OS.

9. The system for power management in a computer system having at least one power grid as recited in claim 8, wherein a partitionable configuration of said computer system is disposed in an intranet.

10. The system for power management in a computer system having at least one power grid as recited in claim 9, wherein said partionable configuration of said computer system is operable with a firewall arrangement having a UPS isolator.

11. The system for power management in a computer system having at least one power grid as recited in claim 10, wherein said service structure is operable to send said loss of power notification to said slave service structure via said intranet.

12. A method for power management in a computer system having at least one power grid, comprising:
   receiving a loss of power notification from an uninterrupted power supply (UPS) associated with a portion of said at least one power grid;
   querying an alternative source of power associated with said at least one power grid for power, availability;
   continuing to supply power to said computer system from said alternative source of power upon determining that said alternative source of power is available; and
   sending a loss of power message to an operating system (OS) instance executing on said computer system if no power is available from said alternative source of power.

13. The method as recited in claim 12, wherein said alternative source of power further comprises an AC line.

14. The method as recited in claim 12, wherein said alternative source of power further comprises a second UPS.

15. The method as recited in claim 12, further comprising the step of sending said loss of power message to additional OS instances executing on said computer systems.

16. The method as recited in claim 15, wherein said step of sending said loss of power message to additional OS instances is effectuated via an intranet having a firewall configuration.

17. A system for power management in a computer system having multiple power grids, comprising:
   means for receiving a loss of power notification from an uninterrupted power supply (UPS) associated with a portion of said multiple power grids;
   means for querying at least one alternative source of power associated with said multiple power grids for power availability;
   means for continuing to supply power to said computer system from at least one available alternative source of power; and
   means for sending a loss of power message to an operating system (OS) instance executing on said computer system if no power is available from said at least one alternative source of power.

18. The system for power management in a computer system as recited in claim 17, wherein said alternative source of power further comprises an AC line.

19. The system for power management in a computer system as recited in claim 17, wherein said alternative source of power further comprises a second UPS.

20. The system for power management in a computer system as recited in claim 17, further comprising means for sending said loss of power message to additional OS instances executing on said computer systems.

21. The system for power management in a computer system as recited in claim 20, wherein said means for sending said loss of power message to additional OS instances is operable to transmit said loss of power message effectuated via an intranet having a firewall configuration.

22. A system for power management in a computer system having at least one power grid, comprising:
   at least one uninterrupted power supply (UPS) operating to supply power to a portion of said at least one power grid, wherein said at least one UPS is operable to send a loss of power notification;
   at least one alternative source of power for supplying power to said at least one power grid; and
   a service structure executable on said computer system, said computer system operating with a first instance and a second instance of an operating system (OS), said service structure for monitoring said at least one UPS and said at least one alternative source of power, wherein said service structure is operable, responsive to receiving said loss of power notification from said at least one UPS, to continue to maintain power supply of said computer system from said at least one alternative source of power upon determining that said at least one alternative source of power is operational, and further wherein said service structure is operable to send a loss of power message to said second instance of OS via a slave service structure associated therewith upon determining that no alternative source of power is operational.

23. The system for power management in a computer system having at least one power grid as recited in claim 22, wherein said at least one alternative source of power includes an AC power line.

24. The system for power management in a computer system having at least one power grid as recited in claim 22, wherein said at least one alternative source of power includes a second UPS.

25. The system for power management in a computer system having at least one power grid as recited in claim 22, wherein said service structure is operable to send said loss of power message to said first instance of OS responsive to receiving said loss of power notification.

26. The system for power management in a computer system having at least one power grid as recited in claim 22, wherein said first and second instances of OS are each disposed in a respective partitionable configuration of said computer system.

27. The system for power management in a computer system having at least one power grid as recited in claim 26, wherein at least one partitionable configuration of said computer system is disposed in an intranet.

28. The system for power management in a computer system having at least one power grid as recited in claim 27, wherein said at least one partitionable configuration of said computer system is operable with a firewall arrangement having a UPS isolator.

29. The system for power management in a computer system having at least one power grid as recited in claim 27, wherein said service structure is operable to send said loss of power message to said slave service structure via said intranet.

* * * * *

UNITED STATES PATENT AND TRADEMARK OFFICE
CERTIFICATE OF CORRECTION

PATENT NO. : 7,036,035 B2 Page 1 of 1
APPLICATION NO. : 10/219744
DATED : April 25, 2006
INVENTOR(S) : Michael Allison et al.

It is certified that error appears in the above-identified patent and that said Letters Patent is hereby corrected as shown below:

In column 7, line 60, in Claim 10, delete "partionable" and insert -- partitionable --, therefor.

In column 8, line 7, in Claim 12, after "power" delete ",".

Signed and Sealed this

Twenty-first Day of April, 2009

JOHN DOLL
*Acting Director of the United States Patent and Trademark Office*